May 24, 1955 M. ROSENBERG 2,709,248

MAGNETIC CORE MEMORY SYSTEM

Filed April 5, 1954 3 Sheets-Sheet 1

MILTON ROSENBERG
INVENTOR

BY Lyon & Lyon

ATTORNEYS

May 24, 1955 M. ROSENBERG 2,709,248

MAGNETIC CORE MEMORY SYSTEM

Filed April 5, 1954 3 Sheets-Sheet 2

MILTON ROSENBERG
INVENTOR

BY Lyon & Lyon
ATTORNEYS

May 24, 1955 M. ROSENBERG 2,709,248

MAGNETIC CORE MEMORY SYSTEM

Filed April 5, 1954 3 Sheets-Sheet 3

MILTON ROSENBERG,
INVENTOR.

BY Lyon & Lyon
ATTORNEYS

United States Patent Office 2,709,248

Patented May 24, 1955

2,709,248

MAGNETIC CORE MEMORY SYSTEM

Milton Rosenberg, Santa Monica, Calif., assignor to International Telemeter Corporation, Los Angeles, Calif., a corporation of Delaware Application April 5, 1954, Serial No. 421,121

7 Claims. (Cl. 340—174)

This invention relates to static magnetic memory systems, and, more particularly, to improvements in the construction and operation of magnetic core memory systems.

In an article by J. W. Forrester entitled "Digital information storage in three dimensions using magnetic cores," found in the Journal of Applied Physics, volume 22, pages 44 to 48, January 1951, there is described a coincident current magnetic core memory. A further description of this type of memory is found in an article by Jan A. Rajchman entitled "Static magnetic matrix memory and switching circuits" in the RCA Review, volume 13, pages 183 to 201, for June 1952, and the latest work by Dr. Rajchman on magnetic core memories is found in the October 1953 Proceedings of the IRE entitled "A Myriabit magnetic-core matrix memory," pages 1407 to 1421. These articles describe a magnetic memory consisting of cores of magnetic material capable of saturation in either of two polarities, which may be designated as "P" or "N" and which may be driven from one to the other. The cores usually take the form of small toroids. The preferred hysteresis characteristic for magnetic material of which these cores are made is rectangular. Accordingly, to drive a core from "P" to "N" or vice versa there is a definite minimum or critical magnetomotive force required to be applied, or the core stays where it was before the force was applied. Less than this magnetomotive force can provide some magnetic excursion, but essentially the saturated condition in the particular polarity of saturation remains.

As shown in the articles, these cores are arranged in columns and rows. A different coil is inductively coupled to all the cores in each column. Each of the coils is known as a column coil. A different coil is inductively coupled to all the cores in each row. Each of these coils is known as a row coil. A single reading coil is inductively coupled to all the cores in the memory. Selection of a core for storage of digital information is made by exciting a row coil and a column coil coupled to that core with sufficient current to drive that core to "P" or "N," depending on whether the information sought to be stored is a "1" or a "0." The currents applied to the row coil and the column coil are each less than the critical value. However, any core receiving the effects of these currents coincidently receives a magnetomotive force in excess of the critical value and, therefore, is driven to saturation. For determining the storage condition of a core, drives are always applied to drive it toward a given polarity. If already at this polarity, no voltages are induced in the reading coil, and, if not in this polarity, then a voltage is induced in the reading coil. These concepts are described in detail in the above-noted articles.

It is interesting to note in the articles that these same magnetic cores may also be employed as switches for the purpose of driving a memory. furthermore, in addition to being suitable for a two-dimensional storage array, the cores may also be used to provide a three-dimensional storage array, wherein a plurality of two dimensional storage planes are simultaneously driven and inhibiting excitation is used selectively. This permits a word, consisting of a number of binary digits, to be stored in a three-dimensional magnetic memory, one bit being stored in each plane in a corresponding position.

In perusing the literature on magnetic core storage, it will be noted that in almost every instance the highest speed possible is attempted to be attained with these memories. However, if a magnetic memory of this type is considered from a design standpoint, it is found that when this memory is sought to be fitted into an actual high-speed digital computer, the time actually taken to operate the magnetic memory for writing or reading is small, compared to the other operating times of such computer. Hence, it is possible to operate a magnetic core memory at a much lower rate than was originally conceived without decreasing the over-all operating rate of a computer by any noticeable factor.

In the operation of magnetic matrices, it is noted that as the size of the matrix is increased the ratio of desired to undesired signal at the output of the reading coil is reduced. When reading coils are checkerboarded, i. e., the sense of the winding on each core is reversed and all the cores selected are chosen to have extremely uniform characteristics, a first order of cancellation is achieved. However, with an increase in the matrix size, the number of uniform cores required is increased. Since the art has not yet reached the point where cores can be made uniformly in every instance, either a large and costly number of rejects is obtained, or the matrix size attainable rapidly approaches a limit, or the uniformity requirements for the cores is reduced, with consequent complexities in driving and reading circuitry, in order to overcome the effects produced by the reduced uniformity requirements. One of the effects is to require absolutely uniform driving currents. The current applied to the cores may be more readily maintained uniform if vacuum tubes are employed and the drive is direct. Uniform driving currents are difficult to obtain using magnetic switch drives. It is preferred to employ switch drives, however, as they are much cheaper and more reliable in reducing the number of vacuum tubes employed.

When a core in a memory is driven, as by either a column coil or a row coil excitation, it has a magnetic excursion. When the drive is removed, it does not return to the same magnetic position from which it originally started, but it may return to a position in a slightly less saturated region. Successive partial drives can cause successive and different magnetic excursions. These effects are due to the core traveling around different minor hysteresis loops with the different excitations. These are known as the delta effects, and can be found described in detail in an engineering report by E. A. Guditz entitled Delta in Ceramic Array No. 1, E488, October 14, 1952, which is obtainable from Massachusetts Institute of Technology. Cores in a memory, which are not selected but which are in a row and column in which a selected core is included, receive the partial drives and, accordingly, are not left in the same magnetic positions. When reading is desired, as briefly described previously, the selected core is driven, and the presence or absence of an induced voltage in the reading coil is indicative of the condition of the selected core. However, with delta effects, amongst others, voltages are induced in the reading coil from the partial driven cores which are not canceled by the checkerboarding of the reading winding which can become sufficiently large to mask the signal from the selected core.

In a copending application for a Magnetic Core Memory System, filed April 5, 1954, Serial Number 421,142, by Raymond Stuart-Williams, Matthew Arnold Alexander, and this applicant, there is described and claimed a systems for minimizing adverse effects including delta effects. This includes utilizing a rectangular array for the cores and scheduling the application of the current drives to the row and column coils so that one comes on first and any disturbances caused by that one being applied are allowed to subside before the second drive is applied. This type of program permits the employment of different reading apparatus including a reading coil than those utilized heretofore. This novel reading apparatus is the subject of this application.

As mentioned in the previously referred to article by Dr. Rajchman, the winding of the various coils on the cores is an extremely difficult and tedious operation. The reading coil is one of the most difficult and the time consuming windings to apply to a magnetic core memory because of the necessity for checkerboarding or reversing the sense of the winding on every core in progressing through the matrix. Not only are unwanted voltages induced in the reading coil as a result of the half-drives of the cores but, also, as a result of pickup through the air. Other effects caused by a common reading coil for all the cores in a memory are that the inherent resistance of the coil results in reducing the output voltage available. Furthermore, there is a capacitive load upon the driving coils since each column is linked with every other column by the reading coil.

It is an object of the present invention to provide a reading coil for a magnetic core memory which is simpler to wind than those employed heretofore.

Another object of the present invention is to provide novel and improved reading apparatus for a magnetic core memory.

Still another object of the present invention is to provide improved reading apparatus for a magnetic core memory which reduces resistance drops and capacitive loading in the memory.

Still a further object of the invention is to provide novel and improved apparatus for a magnetic core memory which isolates the reading coil from its external load.

These and other objects of this invention are achieved by providing reading apparatus for a magnetic core memory consisting of two magnetic cores for a given group of columns of cores in the memory (preferably an even number of columns). These cores are biased to the low slope portion of their characteristic curve (preferably subsantially rectangular characteristics) which occurs in their saturated regions. Each of the column coils of the associated group of columns of cores is inductively coupled to the pair of cores. The coupling sense and the number of turns of the coupling is selected so that when a driving pulse is applied to any one of the column coils the pair of cores is driven to a high slope on their characteristic curves (region of low saturation). A reading coil is coupled to all the cores in a group of columns (instead of to all the cores in the memory) and also to the pair of cores. The coupling to the pair of cores is opposite, so that a drive caused by voltages induced in the reading coil drives both cores in opposite directions. The sense of the coupling of the reading coil to the group of core columns is such that a drive to any row coil alone will produce substantially no net voltage in the reading coil. An output coil is provided which also has opposite sense couplings on each pair of cores. Accordingly, a column coil drive to the pair of cores, being in the same direction for both cores, results in substantially no net output voltage in the output cores. A drive from the reading coil, however, in view of the manner of coupling, results in an output voltage in the output coil.

The novel features that are considered characteristic of this invention are set forth with particularity in the appended claims. The invention, itself, both as to its organization and method of operation, as well as additional objects and advantages thereof, will best be understood from the following description when read in connection with the accompanying drawings, in which:

In the following description of the magnetic memory core system, for convenience in description, a row coil may be referred to as the "Y" line of the matrix and the column coil may be referred to as the "X" line of the matrix. By "row coil" is to be meant the coil coupling all of the cores in a given row in a matrix. By "column coil" is to be understood, similarly, the coil coupling all of the cores in a column of the matrix. The "reading coil" is the coil coupling all of the cores in the matrix so that driving one or more of the cores induces voltages in the reading coil. By "delta effect" is meant, as previously stated, the effects caused by cores traveling on different minor hysteresis loops with different drives.

*The principles of the proposed system*

Figure 1:
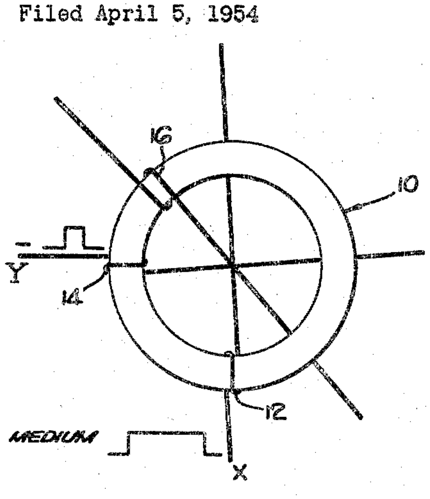
Figure 1 represents a core and its associated windings in a magnetic memory matrix.

The presently known principle of operation of magnetic core matrices requires that two equal current pulses should be coincident at a selected core, the sum of the currents being sufficient to change the state of the core, while one pulse alone is insufficient. If maximum speed of operation is required, these pulses should be as short as possible and exactly coincident. Considerable thought has been given in the past to ensure exact time coincidence. However, if time is not too important, one pulse may be much longer than the minimum possible value. This pulse is established first, the shorter pulse occurring later. Figure 1 shows a toroidal storage core 10 of a type suitable for use in a magnetic matrix memory. The core has three windings 12, 14, 16 inductively coupled thereto. One winding 12 is part of a column coil or "X" line, a second winding 14 is part of a row coil or "Y" line, and the third winding 16 is part of the reading coil used in a magnetic memory. A long pulse is applied to the X line of the matrix and a short pulse is applied to the Y line during the long pulse.

Figure 2:
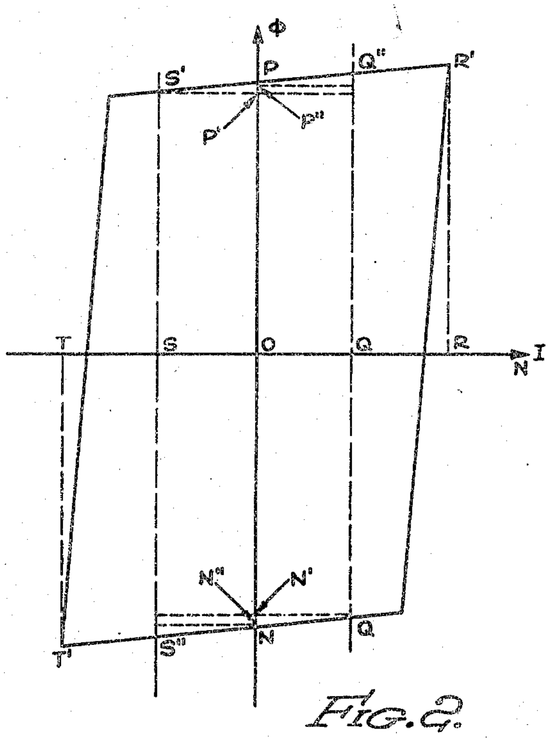
Figure 2 represents a typical hysteresis characteristic shown for the purpose of assisting in the explanation herein.
Figure 3:
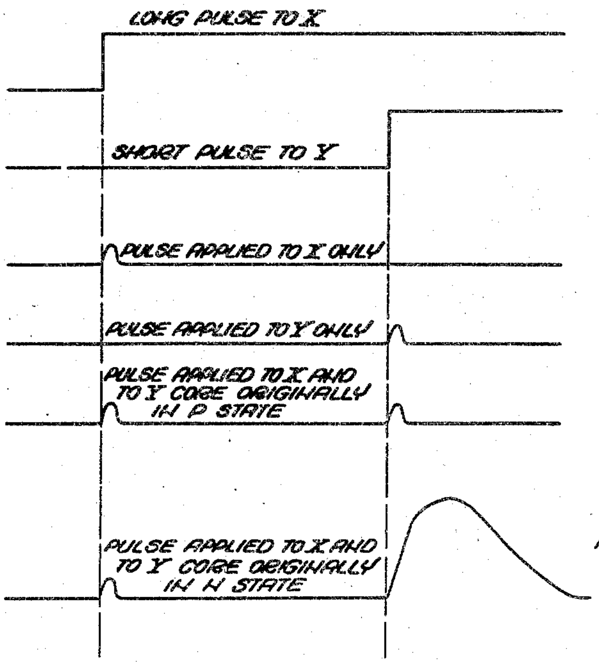
Figure 3 represents typical wave shapes obtained in a reading coil in a matrix excited by long and short pulses.

A typical hysteresis loop of a storage core 10 is shown in Figure 2. The core is said to be storing "0" if at state P or to be storing "1" if at state N. The magnitude of the magnetomotive force, or M. M. F., provided by the X or Y line is represented by amount "OQ." Provided the turns are fixed, the M. M. F. can be expressed in terms of the current flowing in the wires. If a single pulse of current is applied to the core, it will move first to Q′ or Q″, depending on whether it was storing at N or P. When the pulse is released, it will move back to the axis to a point very near N or P. Since the top and bottom portions of the loop are not exactly horizontal, some output will appear in the reading winding as a result of these excursions. If now both pulses are applied, the pulse will move first to Q′ or Q″, as before. When the Y pulse commences, the core will move to R′. When the Y pulse finishes, the core will move to Q″, and, when the X pulse finishes, the core will move to P. If the core was originally at P, the excursion Q″R′ will occur during the Y pulse. This will produce a signal in the reading coil that is approximately equal to that produced by a PQ″ movement. If the core was at N, the excursion Q′R′ will occur during the Y pulse. This will cause a very large signal output. Thus, the only time at which a large signal can be produced in a selected core is during the Y pulse and if the selected core was storing in state N. The pulses occurring in the reading coil are illustrated in Figure 3.

This shows the X pulse or column coil pulse, the Y pulse or row coil pulse, the effects of the single application of these pulses in the reading coil, and the effects of the combined application of these pulses when a core is in P and when a core is in N.

This process of driving a matrix makes it possible to separate the occurrence in time of the disturbing pulses due to the X selection and those due to the Y. If now, reading is commenced at the beginning of the Y pulse after any disturbance due to the X pulse has finished, only those cores on the selected line in the Y direction cause disturbance. In a square array, only half the energized cores contribute to the disturbance, and, therefore, the undesired signal at the output due to nonuniformity of the cores is reduced by $\sqrt{2}$ as this is a random effect. This always assumes that the normal compensating type of reading winding has been employed, for example, the checkerboard in which the windings on alternate cores are arranged so that disturbing signals of opposing polarity are induced therein and hence tend to cancel each other. The delta effect, however, increases linearly with the number of cores disturbed, and, therefore, this is reduced by two.

In a large matrix, the delta effect is more important than errors due to nonuniformity, and, therefore, the more important quantity is reduced by the major amount. This improvement can be made larger still by making the matrix rectangular instead of square. For example, a 4096 bit matrix can be assembled either as 64 by 64, 128 by 32, 256 by 16, and so on. If, now, the longer pulse drives the line linking the greater number of cores and the shorter pulse drives the line with the smaller number of cores, the disturbance is reduced still more.

If more time is permitted, the long X pulse should rise very slowly. The output occurring during this pulse is then very small as the rate of rise of current and, hence, output voltage is small. Thus the early pulses can be completely neglected. This has an additional advantage that the voltage drop in the X windings is small, simplifying the problem of driving the large number of cores on this winding which is inherent in the use of the rectangular matrix.

Figure 4:
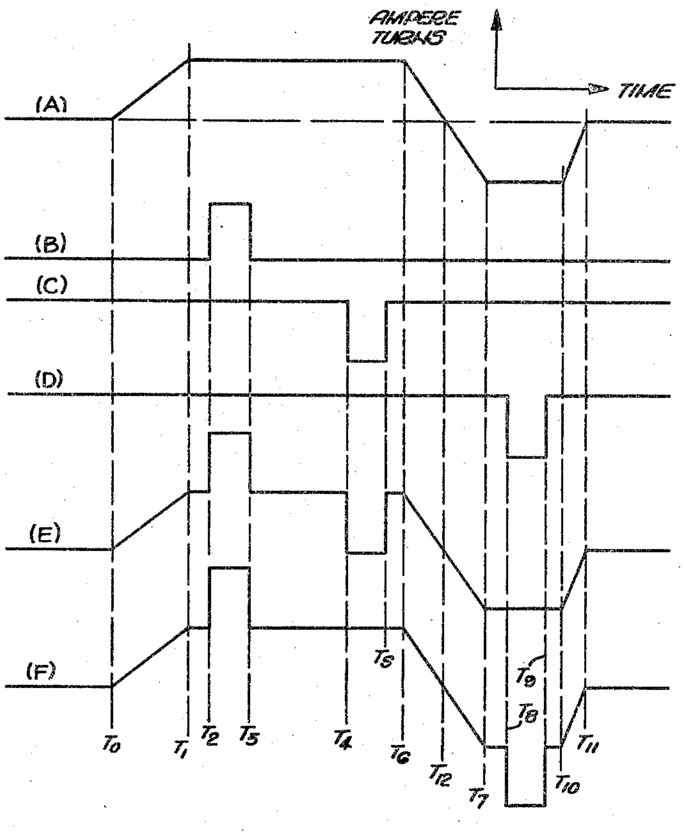
Figure 4 represents the current waveforms required for operating a matrix in accordance with a preferred program embodying the invention.

Figure 4 shows the current waveforms applied to the X and Y lines to achieve a preferred method of operation of a magnetic matrix memory.

Waveform A is applied to a selected X wire. It commences at time $T_0$ and rises slowly to its maximum possible value by time $T_1$. Its rise time may be on the order of a turnover time of a core. It then remains at this value, producing a magnetomotive force represented by OQ in Figure 2 until time $T_6$. The duration of the plateau time of waveform A is on the order of a multiple of the turnover time of a core. It then changes from its maximum positive value to its maximum negative value, producing a magnetomotive force represented by OS in Figure 2 by time $T_7$. It then remains at this value until time $T_{10}$, when it decays to zero by the final time $T_{11}$. The negative portion of the waveform may be substantially the same in duration, amplitude, and rise time as the positive portion, or it may even have a shorter duration for reasons appearing later.

Waveform B is applied to the selected Y line between times $T_2$ and $T_3$. $T_2$ follows $T_1$ by a time sufficient to allow all disturbance due to the application of waveform A to have subsided. This is usually on the order of the turnover time of the cores used. The amplitude of the pulse is equal to that of the positive part of pulse A. The duration, $T_2$ to $T_3$, is sufficient to allow the selected core to move from state N to state P completely, this being on the order of the core turnover time.

A time delay $T_3$ to $T_4$ allows sufficient time to complete the reading process and to transfer the information determining whether the core is to be set to P or N.

If it is desired to leave the core at P, a current pulse C is applied to the Y line during times $T_4$ to $T_5$. This pulse has exactly the same characteristics as B, except that it is negative going. The time $T_5$ to $T_6$ is inserted to reduce the requirement for accurate timing.

If it is desired to reset the core to N, pulse D is applied to the Y line instead of pulse C. This pulse has the same shape and amplitude as pulse C. Its duration $T_8$ to $T_9$ is less than $T_7$ to $T_{10}$ to remove the need for accurate timing.

The magnetomotive force applied to the selected core, if it is finally set to P, is shown in waveform E. The magnetomotive force applied to the selected core when it is set in N is shown in waveform F.

The force applied to an unselected core on a selected X line may be represented by wave shape A. The force applied to an unselected core on a selected Y line may be represented by wave shapes B and C or B and D. Hence, any energized unselected core receives equal forces in both directions during the cycle. By an unselected core is meant a core which is inductively coupled to either an energized column coil or row coil but not to both. The core coupled to both is a selected core and will be driven to P or N as shown by wave shapes E or F.

Reading is commenced in the cycle at time $T_2$ and finishes by time $T_4$. Hence, only the disturbance due to the Y current pulse is read, since by the time the reading commences the disturbance due to the application of the X current pulse has subsided.

One important advantage of this system for driving cores is that cores need to be uniform in any single Y line only, as this is the place in which disturbances are significant. This has two results. First, a large number of grades of cores may be used so that all good storage cores may be incorporated in the equipment. In fact, the acceptance figure is 80 per cent, rather than 25 per cent, for previous methods of using cores. Secondly, the cores in any Y line may be made extremely uniform, so uniform, in fact, that nonuniformity effects can be neglected. When this method of driving the cores is employed for a rectangular matrix having, for example, more columns than rows, with the X drive being applied to the column coils and the Y drive to the row coils since there are fewer cores in each row, the number of required uniform cores is considerably reduced.

Consider the case of a core being set to P employing the X and Y drives represented, respectively, by wave shapes A and B. By time $T_1$, the core has moved either to Q′ or Q″ in Figure 2, depending on whether it was at N or P to begin with. By time $T_3$, it is at R′. By time $T_4$, it is at Q″. By time $T_5$, it is at P. It then returns to Q″ and then through to S′ by time $T_{10}$. By time $T_{11}$, it has moved to P′.

In a similar manner, a core being set to N finally ends at N. Hence, P′ and N are the initial storage points. In accordance with this method of driving, any subsequent disturbances of the core when it is not in the selected position are of the ½P—½N type. A core at N will move to N″ under the influence of the first disturbance. During the ½P portion of the cycle, a core at N moves from N to N′, a core at P moves from P′ to P″. However, the original drive action and any subsequent disturbances are symmetrical. Hence, P′P is equal to N′N. Since P″ is very near P, then P′P″ is very nearly equal to NN′. This equality will improve with subsequent disturbances. Hence, if the cores are chosen in pairs and the reading coil is wound so that the voltage output of each member of the pair is induced in an opposing manner in the reading coil, the output from them will be zero if both cores are in the same state at PP″ if they are in opposite states. It is known that this amount is very small.

As a result of use of unequal pulse-length drive systems, the following advantages are obtained:

1. The ratio of desired to undesired signal at the output of the reading winding is increased because:

*a.* The contribution due to the X cores is neglected;

*b.* By making the matrix rectangular effect, *"a"* can be increased;

*c.* Errors due to nonuniformity can be neglected, as it is only necessary to keep all cores in each Y line uniform. Hence, high uniformity is possible; and

*d.* In the preferred program, due to the inherent symmetry of operation of the cores, the delta effect is reduced.

2. The reduction in over-all matrix core uniformity afforded by this system allows one to utilize a larger percentage of manufactured cores than heretofore possible.

3. It is generally possible to apply more rigid control of current on long pulses such as occur in A of Figure 4. This is particularly so in this case, as only a portion of the top of these pulses must be accurately controlled. This allows one to place wider tolerances on the fast Y line pulses, making it easy to use magnetic switches for providing the Y line pulses. The rigid control of the X pulses is extremely easy in the systems shown later herein, as direct drive of the X wires is employed. This is possible as the number of X wires is small and the waveforms rise and fall slowly, so that no large voltages have to be provided by the drivers.

Figure 5:
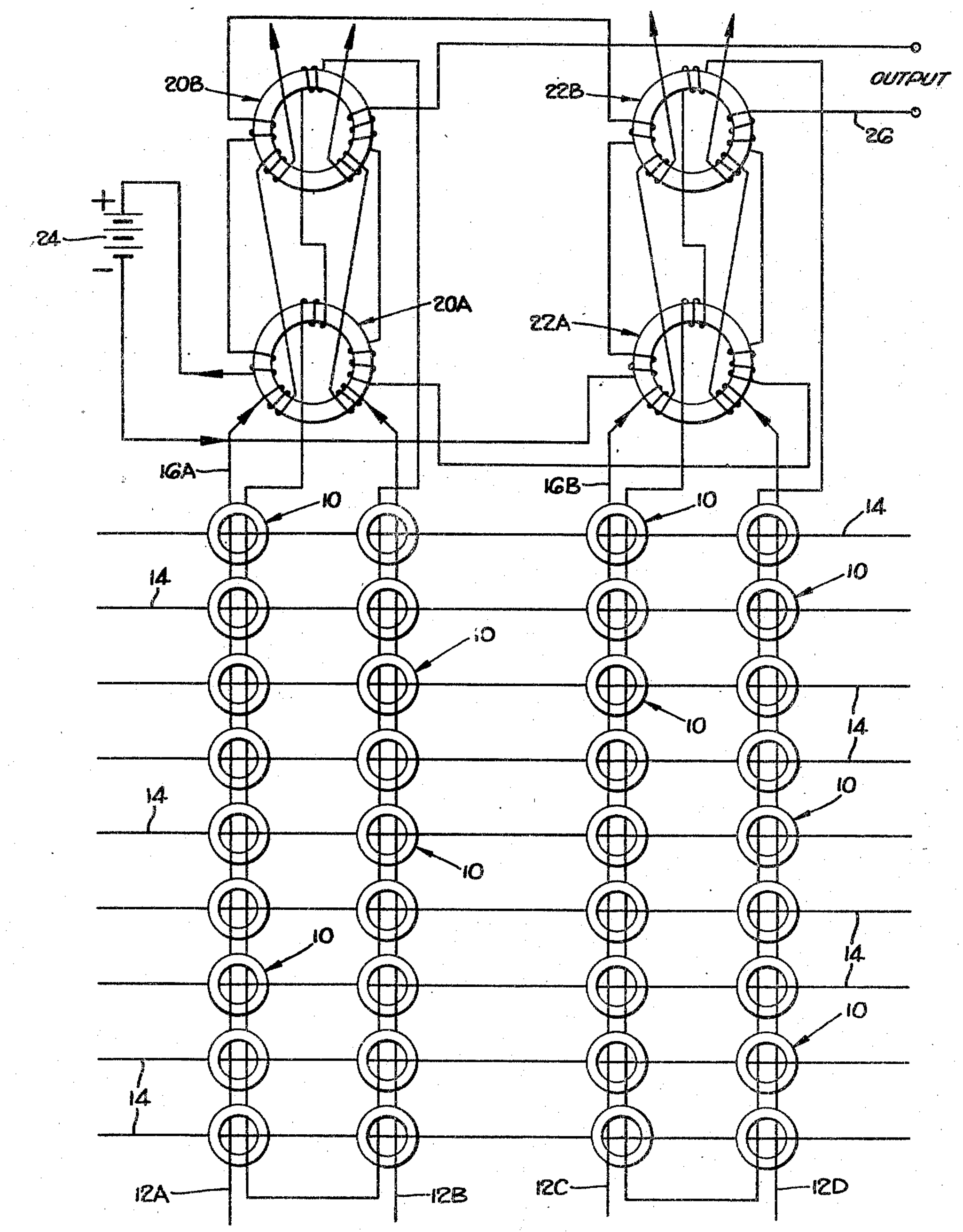
Figure 5 represents a schematic diagram of an embodiment of the invention.

Referring now to Figure 5, there is shown a preferred embodiment of the invention being used as reading apparatus for a magnetic core memory. The core memory shown consists of only four columns and nine rows of cores. It should be understood, however, that this is only by way of example and is not to be construed as a limitation on the invention. This invention may be used with any desired array size and also for three-dimensional arrays.

As shown in Figure 5, there are two cores 20AB, 22AB associated with each two columns of cores 10. More than two columns may be associated with the two cores (any even number of columns may constitute the associated group), but two are preferred. A bias is applied to the pairs of cores from a DC inhibit source 24 which maintains the pairs of cores during standby operation at position S″ on the characteristic curve shown in Figure 2. The column coils 12A, B, C, D of each column are respectively inductively coupled to the associated pair of cores. The number of coupling turns and the sense of the turns of these column coils on the respective pairs of cores is such that when any one of the column coils is driven the associated pair of cores is driven to a high slope region on the core characteristic curve which is any place along the line L of the characteristic curve shown in Figure 2.

A reading coil 16A, 16B is provided for each group of columns. Accordingly, there are as many reading coils as there are groups of columns. Each reading coil is coupled to all the cores in its group. The coupling is made so that in any given row of cores there are as many cores coupled to a reading coil by windings in one sense as there are in the opposite sense. Thus, effectively, in the embodiment shown, a Y drive alone will cause substantially the same amplitude and opposite polarity voltages to be induced in each reading coil from a pair of cores. Obviously, the net voltage is zero. The reading coil for each column group is coupled to the associated pair of cores 20AB, 22AB by windings having opposed senses. This means that when a driving voltage is induced in a reading coil from a turned-over core 10 it will cause the pair of cores to which it is coupled to have magnetic excursions in opposite directions.

An output coil 26 is coupled to all the pairs of cores. The sense of the coupling to each pair of cores is opposite, so that the effect of the drive of a pair of cores by a column coil produces substantially no net voltage in the output coil. The effect of any reading coil drive, however, is doubled and does produce an output voltage.

Effectively, therefore, each pair of output cores and their associated windings may be likened to a transformer having a saturable core. A column coil drive operates to move the core in direction of desaturation. The primary winding of the transformer is the reading coil, and the secondary winding is the output coil.

From the previous description of the preferred manner of operating a matrix, it will be appreciated that if a core whose condition is desired to be read is in P, the application of the Y drive upon the pre-existing X drive will not produce any voltage in the output coil. If the desired core is in condition N prior to reading, then upon application of the Y drive the core is driven to P and a voltage is provided at the output coil. Reading occurs during the Y drive interval only.

Coupling the reading coil to two columns reduces the requirement for core uniformity, since only the two cores in any row coupled to the same reading coil need be uniform. This should be contrasted with the number of uniform cores required for previously known memory systems which were quite high and, therefore, difficult to attain without excessive core rejection. The simplicity of winding the reading coil shown herein over those previously known should be appreciated. Of course, reading coil resistance and capacitive loading is measurably reduced, since a much smaller reading coil is used. Furthermore, the reading coils are effectively isolated from the external load which is also beneficial. Means for selecting a column coil and a row coil and applying current drives thereto, as well as for restoring a core to the condition it had before reading, are not shown herein, since these systems are known, are shown in the articles previously referred to, and circuitry for applying the specific program of long column pulses and short row pulses are described in detail in the application of Stuart-Williams et al., previously cited herein. Furthermore, these are not required for understanding of this invention.

There has accordingly been described and shown herein a novel, useful, and simple apparatus for determining the condition of a core in a magnetic memory.

I claim:

1. In a magnetic matrix memory of the type including a plurality of cores of magnetic material having substantially rectangular hysteresis characteristics said cores being arrayed in columns and rows, a plurality of row coils each of which is coupled to all the cores in a different row, a plurality of column coils, and means for applying current pulses to a column coil and to a row coil coupled to a selected core to drive said selected core to saturation at a desired polarity, a current pulse being applied to one of said coils sufficiently before the application of a current pulse to the other of said coils to permit disturbances caused by the application of the first pulse to subside, reading apparatus for said memory comprising a pair of magnetic cores associated with a number of columns of cores in said memory, means to bias said cores to saturation at one polarity, means to inductively couple said cores to the column coils of the associated number of columns in a manner to oppose said bias when one of said column coils is driven for reading, a separate reading coil inductively coupled to all the cores in each of said associated columns and to said associated pair of cores, the sense of the coupling to one core of said pair being opposite to that of the other, and a reading output coil inductively coupled to each of said pairs of coils, the sense of the coupling to one core of a pair being opposite to that of the coupling of the other.

2. In a magnetic matrix memory of the type including a plurality of cores of magnetic material having substantially rectangular hysteresis characteristics said cores being arrayed in columns and rows, a plurality of row coils each of which is coupled to all the cores in a different row, a plurality of column coils, and means for applying current pulses to a column coil and to a row coil coupled to a selected core to drive said selected core to saturation at a desired polarity, a current pulse being applied to one of said coils sufficiently before the application of a current pulse to the other of said coils to permit disturbances caused by the application of the first pulse to subside, reading apparatus for said memory comprising a pair of magnetic cores associated with column coils in said memory, means to bias said cores to a low slope portion of their characteristic curves, means to drive said cores to a high slope portion of their characteristic curves when any one of said associated column coils are driven for reading, a reading coil coupled to all the cores to which said associated column coils are coupled and to said pair of cores, and output means coupled to said pair of cores to provide an output only when said cores are driven by voltages induced in said reading coil.

3. In a magnetic matrix memory of the type including a plurality of cores of magnetic material having substantially rectangular hysteresis characteristics said cores being arrayed in columns and rows, a plurality of row coils each of which is coupled to all the cores in a different row, a plurality of column coils, and means for applying current pulses to a column coil and to a row coil coupled to a selected core to drive said selected core to saturation at a desired polarity, a current pulse being applied to one of said coils sufficiently before the application of a current pulse to the other of said coils to permit disturbances caused by the application of the first pulse to subside, reading apparatus for said memory comprising a pair of magnetic cores associated with a number of columns of cores in said memory, means to bias each said pair of cores to a low slope portion of their characteristic curves, means to drive each said pair of cores to a high slope portion of their characteristic curves when any of the associated column coils are driven for reading a separate reading coil inductively coupled to all the cores in each of said associated columns and to said associated pairs of cores, and output means coupled to each pair of cores to provide an output only when said cores are driven by voltages induced in said reading coil.

4. Reading apparatus as recited in claim 3 wherein the sense of the coupling of said reading coil to one core of said pair of cores is opposite to the coupling to the other, and wherein said output means includes an output coil inductively coupled to a pair of cores by oppositely sensed windings.

5. Reading apparatus for a magnetic matrix memory of the type including a plurality of cores of magnetic material having substantially rectangular characteristics, said cores being arranged in columns and rows, a plurality of row coils each of which is coupled to all the cores in a different row, a plurality of column coils, and means for applying current pulses to a column coil and to a row coil coupled to a selected core to drive a selected core to saturation at a desired polarity, a current pulse being applied to said column coil sufficiently before the application of a current pulse to said row coil to permit disturbances caused thereby to subside, said reading apparatus comprising a different pair of magnetic cores associated with a pair of columns of cores in said memory, a separate reading coil for each column pair inductively coupled to all the cores in a column pair and to the associated pair of cores, each reading coil being coupled to each core in a pair of cores with opposite sense, means to bias all said pairs of cores to a low slope portion of their characteristic curve, means to couple the column coils of each pair of columns with an associated pair of cores, the sense and the number of coupling turns on said pair of cores being made sufficient to drive said pair of cores to a high slope region of their characteristic curves when any one of said associated column coils is excited by a current pulse, and an output coil inductively coupled to all said pairs of cores, the sense of the coupling on each core of a pair being opposite to that on the other core of said pair.

6. Apparatus for reading as recited in claim 5 wherein each said reading coil is coupled to the cores in any given row to provide substantial cancellation of voltages induced as a result of the application of a row current pulse only to that row.

7. Reading apparatus for a memory of the type including a plurality of cores of magnetic material having substantially rectangular characteristics, said cores being arranged in columns of rows, and means to apply a drive to a row of cores and to a column of cores which include a core which it is desired to drive to saturation at either of two polarities, the drive to a row of cores being applied sufficiently after the drive to a column of cores to permit any disturbances due to the application of the column drive to subside, said reading apparatus comprising a saturable transformer, including a core, and means to bias said core to a region of high saturation, means to drive said core to a region of relatively low saturation when a drive is applied to a column of cores, means including an input transformer winding coupled to the cores in a column to vary the saturation of said core when one of said cores is driven from one polarity to the opposite polarity, and means including an output winding to derive an output from said transformer only when one of said cores in said memory is driven from one polarity to the opposite polarity.

References Cited in the file of this patent

UNITED STATES PATENTS 2,666,151 Rajchman ---------- Jan. 12, 1954
2,691,156 Saltz ---------- Oct. 5, 1954